US009491548B2

(12) United States Patent
Batchelder et al.

(10) Patent No.: US 9,491,548 B2
(45) Date of Patent: Nov. 8, 2016

(54) PARAMETRIC SYSTEM FOR GENERATING A SOUND HALO, AND METHODS OF USE THEREOF

(75) Inventors: Luke Batchelder, Somers, NY (US); J. Samuel Batchelder, Somers, NY (US)

(73) Assignee: CONVEY TECHNOLOGY, INC., Somers, NY (US)

(*) Notice: Subject to any disclaimer, the term of this patent is extended or adjusted under 35 U.S.C. 154(b) by 894 days.

(21) Appl. No.: 13/594,409

(22) Filed: Aug. 24, 2012

(65) Prior Publication Data

US 2014/0056107 A1 Feb. 27, 2014

(51) Int. Cl.
*H04B 1/02* (2006.01)
*H04R 5/02* (2006.01)
*H04R 17/00* (2006.01)
*H04R 29/00* (2006.01)

(52) U.S. Cl.
CPC ............... *H04R 5/023* (2013.01); *H04R 17/00* (2013.01); *H04R 29/002* (2013.01); *H04R 2201/401* (2013.01); *H04R 2217/03* (2013.01)

(58) Field of Classification Search
CPC ................................. H04R 5/02; H04R 5/023
USPC .......................................................... 367/137
See application file for complete search history.

(56) References Cited

U.S. PATENT DOCUMENTS 4,963,782 A * 10/1990 Bui et al. ...................... 310/358
5,463,593 A * 10/1995 Zanelli et al. .................. 367/13
6,108,427 A * 8/2000 Norris et al. .................. 381/83
6,466,674 B1 * 10/2002 Norris ............................ 381/93
6,663,578 B1 * 12/2003 Peszynski ................ A61B 8/00 600/437
6,709,392 B1 * 3/2004 Salgo ....................... A61B 8/00 600/437
6,719,449 B1 * 4/2004 Laugharn, Jr. .......... B01F 11/02 366/127
6,778,672 B2 8/2004 Breed et al.
7,313,242 B2 12/2007 Biegelsen
7,388,962 B2 * 6/2008 Cheung et al. ............... 381/381
7,391,872 B2 * 6/2008 Pompei ......................... 381/111
2001/0007591 A1 * 7/2001 Pompei ......................... 381/111
2003/0039370 A1 * 2/2003 Norris ............................ 381/93
2004/0114770 A1 * 6/2004 Pompei ........................... 381/77
2004/0208324 A1 * 10/2004 Cheung et al. ................. 381/77
2010/0092005 A1 4/2010 Dunn et al.

OTHER PUBLICATIONS

Kite et al., "Parametric Array in Air: Distortion Reduction by Preprocessing", Jun. 1998.
Lighthill, M.J., "On sound generated aerodynamically", pp. 564-587, Nov. 13, 1951.

(Continued)

*Primary Examiner* — Isam Alsomiri
*Assistant Examiner* — Amienatta M Ndure Jobe
(74) *Attorney, Agent, or Firm* — Westerman, Champlin & Koehler, P.A.; Amanda M. Prose

(57) ABSTRACT

A parametric system for generating audible sound, comprising a transducer array configured to emit modulated ultrasonic waves in a converging wave pattern toward a focal volume, where the modulated ultrasonic waves are configured to demodulate to generate audible sound waves in the focal volume, and where the generated audible sound waves emanate from the focal volume with a diverging wave pattern.

18 Claims, 5 Drawing Sheets

(56) References Cited

OTHER PUBLICATIONS

Kurimoto et al., "The Suppression for Undesired Reflection towards Audio Spot", Aug. 2010, pp. 1-5.
Smith et al., "Resolution and DOF improvement through the use of square-shaped illumination", 1999, 14 pages.
Westervelt, P., "Parametric Acoustic Array", Apr. 1963, The Journal of the Acoustical Society of America, vol. 35, No. 4.
Yoneyama et al., "The audio spotlight: An application of nonlinear interaction of sounds waves to a new type of loudspeaker design", Jan. 1983, 5 pages.
Yoshimoto et al., "Float characteristics of a squeeze-film air bearing for a linear motion guide using ultrasonic vibration", Jun. 2006, ScieneDirect, 9 pages.
Shealy, W.P., "Parametric Difference-Frequency Generation of Sound in Air", Dec. 1972, 76 pages.

* cited by examiner

PARAMETRIC SYSTEM FOR GENERATING A SOUND HALO, AND METHODS OF USE THEREOF

BACKGROUND

The present disclosure is directed to systems for generating audible sound, such as speaker-based systems, and methods of using such systems. In particular, the present disclosure is directed to systems for generating audible sound waves from ultrasonic waves using parametric interactions.

Conventional parametric speakers produce modulated ultrasonic waves, which in turn demodulate through a non-linear medium to generate highly-directional audible sound waves. As illustrated in FIG. 1, a conventional parametric speaker, commonly referred to as an audio spotlight, typically includes an array 10 of planar transducers that emit collimated ultrasonic waves 12. This generates pressure wavefronts 12*a*, which are fairly steady in the collimated path. While passing through a non-linear medium, such as air, the medium gradually demodulates the ultrasonic waves 12 via parametric interaction to produce audible sound waves within a cylindrical conversion column 14.

Using an optics analogy, the collimated ultrasonic waves 12 emitted from transducer array 10 have a low numerical aperture, such as less than 0.05. This limits the lateral area over which the generated audible sound may be heard by a listener. For example, a person standing at location 16, outside of conversion column 14, would not hear the audible sound. However, a person standing at location 18, within conversion column 14, would hear the audible sound.

Parametric conversion efficiency is proportional to the sound pressure level of the air through which ultrasonic waves 12 travel. A sound wave having a peak pressure of two atmospheres and a trough pressure of vacuum will exhibit a sound pressure level of 194 decibels. At this sound pressure level, the parametric conversion efficiency in air to produce audible sound waves from ultrasonic waves 12 is highly efficient. However, most low-cost parametric speakers only operate between about 110 decibels and 140 decibels, and make up for their lack of efficiency with long interaction volumes, such as in cylindrical column 14.

The long interaction volume in cylindrical column 14 limits how transducer array 10 may be effectively used. For example, if transducer array 10 was intended to present audible content about a particular product in a retail store, transducer array 10 would typically be emit ultrasonic waves 12 vertically downward from a ceiling location of the retail store. The audible sound generated from the demodulated ultrasonic waves would then reflect from the floor to a person standing directly below transducer array 10. However, this does not direct the listener's attention to the intended product. Rather, the listener's attention will be directed to transducer array 10.

Alternatively, if transducer array 10 were otherwise positioned next to the intended product, and oriented to emit ultrasonic waves 12 horizontally, cylindrical column 14 may extend across the entire retail store. If heard by a listener across the retail store, the listener may become confused about what product the audible content is referring to, which is undesirable. As such, there is an ongoing need for parametric systems that produce audible sounds with good parametric conversion efficiencies and that also direct a listener's attention to an intended product or point in space.

SUMMARY

An aspect of the present disclosure is directed to a parametric system for generating audible sound. The parametric system includes a transducer array configured to emit modulated ultrasonic waves in a converging wave pattern toward a focal volume, where the modulated ultrasonic waves are configured to demodulate to generate audible sound waves in the focal volume, and where the generated audible sound waves emanate from the focal volume with a diverging wave pattern. The parametric system also includes a controller configured to operate the transducer array to emit the modulated ultrasonic waves.

Another aspect of the present disclosure is directed to a parametric system for generating audible sound, where the parametric system includes a transducer array that is free of paraxial transducers, and where the transducer array is configured to emit modulated ultrasonic waves with a numerical aperture ranging from greater than about 0.05 to about 0.5 toward a focal volume, such that the emitted modulated ultrasonic waves generate a sound pressure level in the focal volume of at least about 150 decibels. The parametric system also includes a controller configured to operate the transducer array to emit the modulated ultrasonic waves.

Another aspect of the present disclosure is directed to a method for generating audible sound. The method includes emitting modulated ultrasonic waves in a converging wave pattern toward a focal volume, demodulating the emitted ultrasonic waves to generate audible sound waves in the focal volume, and emanating the generated audible sound waves from the focal volume in a diverging wave pattern.

DETAILED DESCRIPTION

The present disclosure is directed to a parametric system that emits modulated ultrasonic waves in a converging wave pattern (e.g., a converging spherical wave pattern) toward a focal volume, generating a sound halo. As discussed below, the converging ultrasonic waves increase the sound pressure level to a peak level at the focal volume, which increases the parametric conversion efficiency for demodulating the ultrasonic waves via parametric interactions. Due to the increased parametric conversion efficiency, the ultrasonic waves readily demodulate within the focal volume to generate the audible sounds waves within a small volume of air (rather than in a long interaction volume).

The audible sound waves then emanate from the focal volume with a diverging wave pattern (e.g., a diverging spherical wave pattern). The diverging wave pattern provides a more uniform dispersion pattern for the audible sound waves to disassociate, which restricts how far the audible content can be heard. As further discussed below, this allows the parametric system to be placed adjacent to (or around) an item or point in space to direct a listener's attention to the item or point in space (i.e., as a sound halo).

Figure 2:
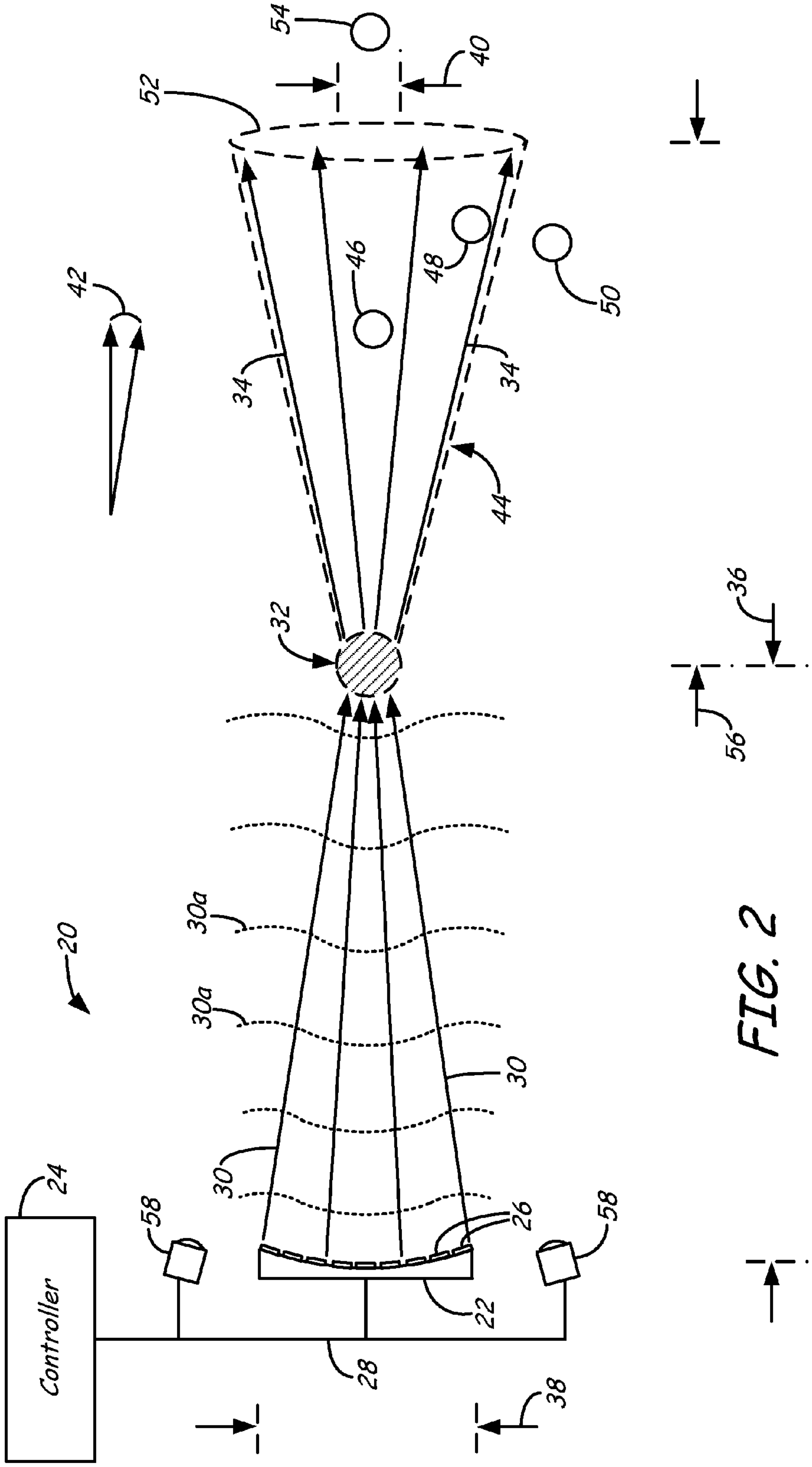
FIG. 2 is a schematic illustration of a parametric system of the present disclosure emitting converging ultrasonic waves.

For example, as shown in FIG. 2, parametric system 20 of the present disclosure includes transducer array 22 and controller 24. Transducer array 22 is an array that includes multiple ultrasonic transducers 26 arranged in a hemispherical pattern. Controller 24 is one or more control circuits configured to monitor and operate the components of system 20. For example, one or more of the control functions performed by controller 24 can be implemented in hardware, software, firmware, and the like, or a combination thereof. Controller 24 may communicate with transducer array 22 over communication line 28, which may include one or more electrical, optical, and/or wireless signal lines.

During operation, controller 24 directs transducer array 22 to emit modulated ultrasonic waves 30 based on a modulation scheme (e.g., via amplitude modulation), where the modulation scheme encodes the intended audible content. Suitable frequencies for ultrasonic waves 30 may range from about 30 kilohertz to about 100 hertz. The lower limit is set by the desire to be inaudible to the human ear, where the highest pitches humans generally can hear are about 30 kilohertz. Since sound velocity depends on the ambient conditions (e.g., pressure, temperature, and air composition), with a reasonable average being roughly 1128 feet per second, a suitable wavelengths for ultrasonic waves 30 may range from about 3.4 millimeters to about 11.5 millimeters.

Figure 1:
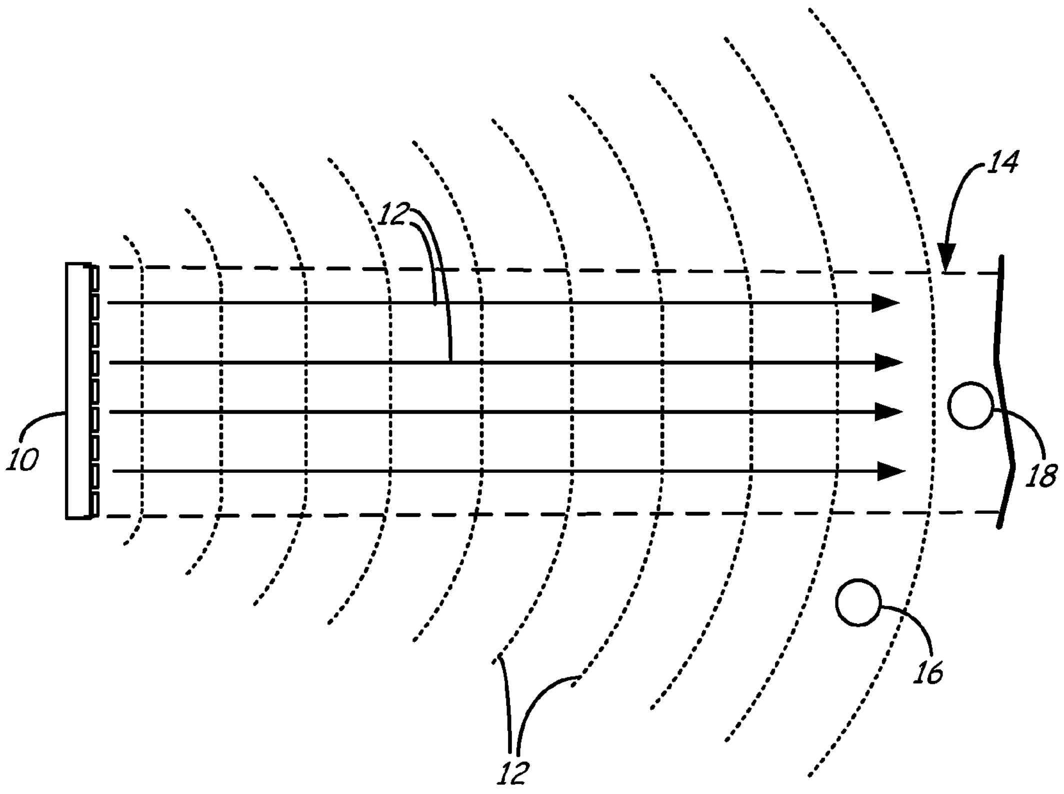
FIG. 1 (Prior Art)
FIG. 1 is a schematic illustration of a prior art parametric system emitting collimated ultrasonic waves.

The hemispherical pattern of transducers 26 emits ultrasonic waves 30 in a converging spherical wave pattern towards focal volume 32. This increases the sound pressure levels, as illustrated by pressure wavefronts 30*a*, to a peak level at focal volume 32. As mentioned above, parametric conversion efficiency is proportional to the sound pressure level of the air through which ultrasonic waves 30 travel. In fact, doubling the pressure within a volume corresponds to a power amplification of about 6 decibels. Unfortunately, low-cost ultrasonic transducers only have sound pressure levels at their surfaces between about 110 decibels and about 140 decibels. This requires the long interaction volumes, such as in conversion column 14 (shown in FIG. 1), to demodulate the collimated ultrasonic waves.

The converging ultrasonic waves 30, however, increase the sound pressure level to at least about 150 decibels within focal volume 32. This readily demodulates ultrasonic waves 30 via parametric interactions to produce audible sound waves 34 from a small volume of air (rather than in a long interaction volume).

For example, the approximate diameter of focal volume 32 (diameter 40) may be represented by Equation 1:

$$d = \frac{2R\lambda}{\pi D}$$

where "d" is diameter 40 of focal volume 32, "D" is lateral width 38 of transducer array 22, "R" is radial distance 36, "λ" is the average acoustic wavelength of ultrasonic waves

30. Equation 1 is most applicable when transducers 26 focus ultrasonic waves 30 in phase, when the surfaces of transducers 26 are small compared to the wavelengths of ultrasonic waves 30 (or when the surfaces of transducers 26 are concave with a radius of curvature substantially matching the hemispherical curvature of transducer array 22), when the radial distance between transducers 26 and the center of focal volume 32 (radial distance 36) is greater than the lateral width or diameter of transducer array 22 (lateral width 38), and if the absorption of the air is ignored over the radius of curvature of transducer array 22.

Correspondingly, the pressure amplification (D/d) within focal volume 32 may be represented by Equation 2:

$$\frac{D}{d} = \frac{\pi D^2}{2R\lambda}$$

In an example application, where lateral width 38 is one-third of radial distance 36 (i.e., D=R/3), and where lateral width 38 is 200 times the average acoustic wavelength of ultrasonic waves 30 (i.e., D=200 λ), the pressure amplification (D/d) within focal volume 32 is about 40 decibels. This can substantially increase the parametric conversion efficiency within focal volume 32 to generate audible sound waves 34 from ultrasonic waves 30. This correspondingly allows the ultrasonic waves 30 to readily demodulate within a small volume of air, rather than over an extended collimated length.

The angle at which ultrasonic waves 30 converge may be referred to in terms of a "numerical aperture", as applied to optics, where the numerical aperture is the sine of angle 42 (i.e., the conical half angle). Accordingly, the hemispherical pattern of transducers 26 may be arranged to direct ultrasonic waves 30 with a numerical aperture ranging from greater than about 0.05 to about 0.5. Examples of particularly suitable numerical apertures range from about 0.1 to about 0.4.

In addition to increasing parametric conversion efficiencies, the converging wave pattern of ultrasonic waves 30 also generates audible sound waves 34 having a diverging spherical wave pattern. This diverging wave pattern provides a more uniform dispersion of audible sound waves 34. In fact, as diameter of focal volume 32 shrinks, the angular distribution of the emanated audio power becomes more isotropic. This provides several benefits.

First, a human listener typically relies on sound wave frequencies ranging from about 400 hertz to about 1200 hertz to determine intelligibility of speech. The diverging wave pattern of audible sound waves 34 causes the distribution of the audible sound beyond focal volume 32 to be less axially focused (i.e., non-collimated) to define a conical audible zone 44. This allows listeners to hear the audible content from audible sound waves 34 without having to stand exactly in front of transducer array 22. For example, persons standing at locations 46 and 48, within audible zone 44, will both be able to hear the audible content. But, a person standing at location 50, outside of audible zone 44, will not be able to hear the audible content.

Additionally, just as the convergence of ultrasonic waves 30 increases the sound pressure levels towards focal volume 32, the divergence of audible sound waves 34 decreases the sound pressure levels as audible sound waves 34 emanate beyond focal volume 32. This decrease is a quadratic drop in sound pressure level based on the distance from focal volume 32. As such, audible sound waves 34 have an audible limit 52 at which the audible levels decay below background noise levels. This restricts how far the audible content can be heard, and effectively caps audible zone 44.

In comparison, the collimated waves emitted from an audio spotlight can continue over long distances. While this may be useful in many applications, such as for projecting audible content over long distances (e.g., for ship-to-ship communications in maritime environments), this can be a disadvantage in many other applications, such as in retail stores. As discussed above, if an audio spotlight (e.g., transducer array 10, shown in FIG. 1) emits ultrasonic waves horizontally, the resulting audible content may extend across the entire retail store, which can be undesirable.

Because the audible levels of audible sound waves 34 decay rather quickly, however, transducer array 22 may emit ultrasonic waves 30 horizontally. As such, transducer array 22 may be positioned adjacent to (or around) an intended item or point in space. In this case, a person located across a retail store, even when standing at a location that is axially aligned with transducer array 22, such as at location 54, will not hear or otherwise be bothered by the audible content.

The particular distance for audible limit 52 from focal volume 32 (audible distance 56) may vary depending on multiple factors, such as the ambient conditions, the power levels of ultrasonic waves 30, and the numerical aperture of transducer array 22. In fact, as the numerical aperture of transducer array 22 increases (i.e., ultrasonic waves 30 converge faster), radial distance 36 is reduced, and audible distance 56 is also reduced due to the increased dispersion of audible sound waves 34.

It is understood that audible limit 52 is typically not a planar limit, and that the various audible sound waves 34 may decay at different rates depending on the ambient conditions and the dispersion rates. However, the average distance of audible limit 52 from transducer array 22 is substantially shorter than the corresponding limit of an audio spotlight. Furthermore, in embodiments in which the numerical aperture of ultrasonic waves 30 is high, the resulting audible sound waves 34 require less equalizing to match the low and high frequency audio levels compared to an audio spotlight, since the dispersion patterns of the low and high frequency audio waves are more closely matched.

As further shown in FIG. 2, in some embodiments, system 20 may also include one or more sensors 58 (two sensors 58 shown in FIG. 2) for detecting the presence of obstructions (e.g., a person) within focal volume 32. The physiological impact of ultrasonic waves having sound pressure levels higher than about 110 decibels is not completely understood. As such, sensors 58 may function as a safety feedback mechanism for parametric system 20, where sensors 58 may also communicate with controller 24 over communication line 28.

For example, sensors 58 may detect the presence of a person's face, hand, or body entering focal volume 32, and communicate this detection to controller 24. Controller 24 may then responding to the detected event, such as by moving the location of focal volume 32 (e.g., by adjusting the relative phases of transducers 26) and/or by attenuating the drive power to transducer array 22.

Sensors 58 may be any suitable sensor for detecting an obstruction in a given volume or location. For example, sensors 58 may be video camera-based sensors that observe focal volume 32 from different perspectives, and may perform frame-to-frame subtraction to detect motion. If both camera sensors 58 detect a change of motion within focal volume 32, then controller 24 may attenuate the transducer array 22 until the obstruction is removed.

Alternatively, one of the camera sensors 58 may be replaced with a pulsed collimated light source, such as an infrared LED. The camera sensor 58 can identify an obstruction within focal volume 32 by the flashes of light detected in that portion of the image coincident with the pulsing of the light source. In a further alternative embodiment, one or more of transducers 26 may be used to measure ultrasonic backscatter of ultrasonic waves 30, similar to detecting a sonar ping. If a person enters focal volume 32, or more desirably prior to entering focal volume 32, a portion of ultrasonic waves 30 may reflect from the person and backscatter to the one or more receiving transducers 26 to detect the person's presence.

FIGS. 3-7 illustrate suitable embodiments for the parametric system of the present disclosure, each which omit paraxial (i.e., on-axis) transducers. This further assists in dispersing the audible sound waves (e.g., audible sound waves 34) by eliminating the transducers that emit ultrasonic waves along the axes of the transducer arrays. Additionally, this provides a suitable axial location for displaying a product or other item, where the transducer array may function as frame for the item. This produces an invisible source of audible sound in front of the framed item so that the audible sound will appear to emanate from the item surrounded by the transducer array (i.e., a sound halo). This directs listener's attention towards the intended item.

Figure 3:
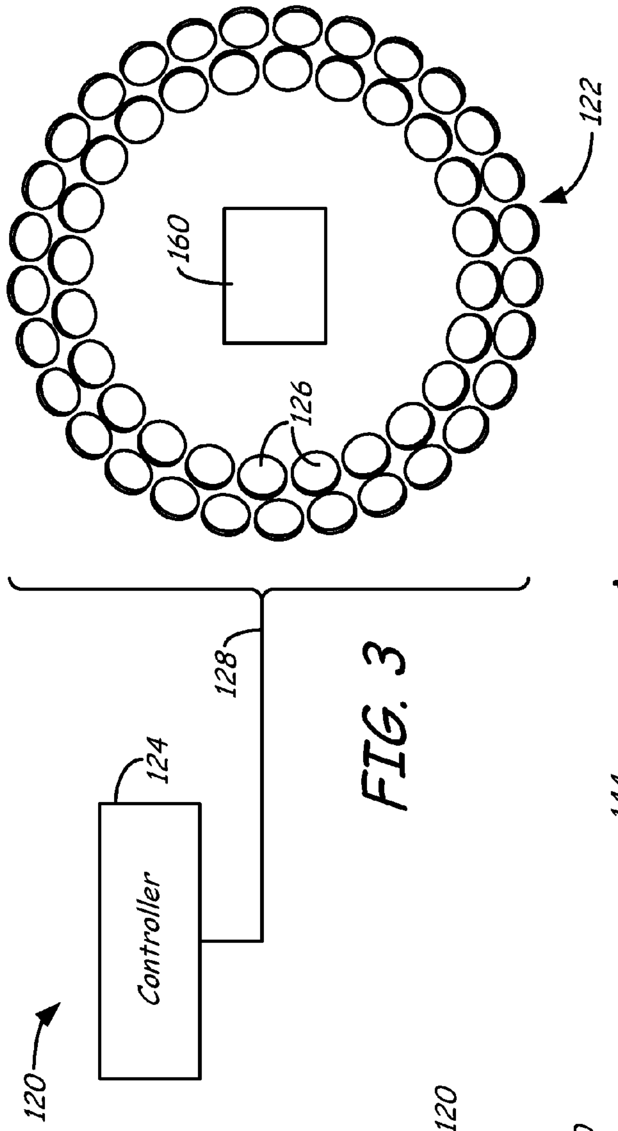
FIG. 3 is a front view of a first embodied parametric system of the present disclosure, having transducers arranged in an annular hemispherical pattern around an item.
Figure 4:
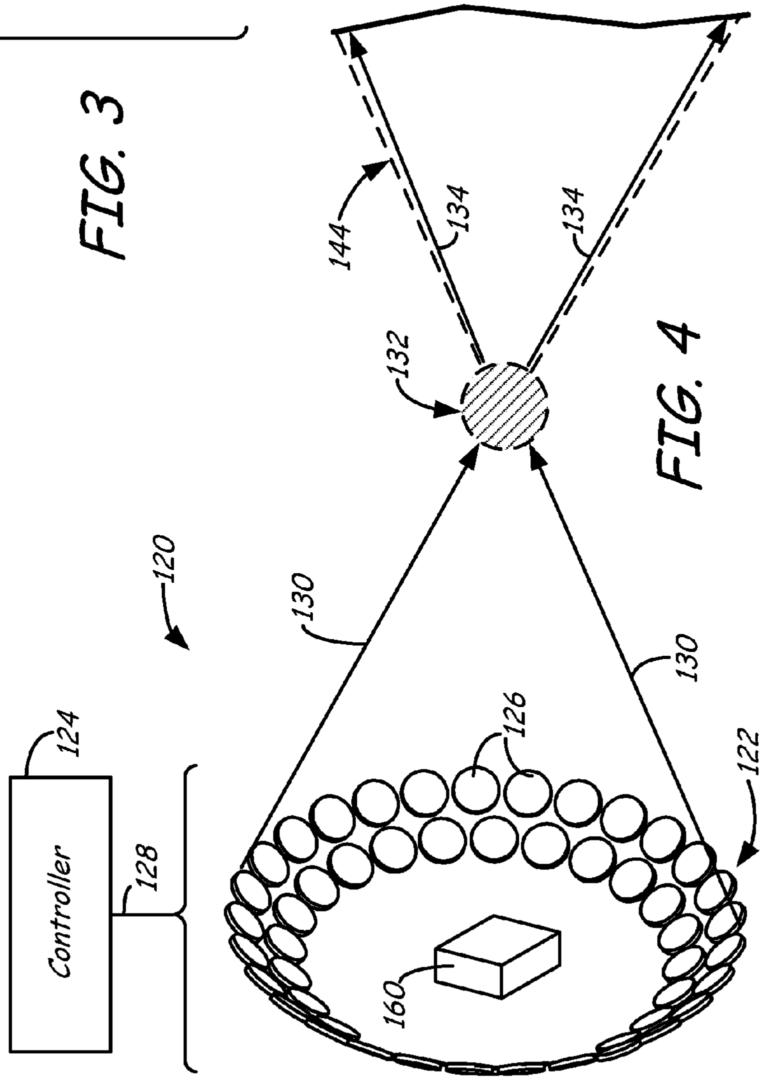
FIG. 4 is a perspective view of the first embodied parametric system of the present disclosure emitting converging ultrasonic waves.

FIGS. 3 and 4 illustrate parametric system 120, which may function in the same manner as parametric system 20 (shown in FIG. 2), where the respective reference numbers are increased by "100", and where sensors 58 are omitted for ease of discussion. As shown in FIGS. 3 and 4, transducer array 122 includes fifty-three transducers 126 arranged around item 160. Transducers 126 may each be any suitable ultrasonic transducing device, such as piezoelectric transducers derived from lead zirconate titanate (PZT) or polyvinylidene difloride, for example. Transducers 126 may also utilize ferroelectrics, and flexible polymer sheets configured as variable capacitors.

Depending on the particular dimensions of transducer array 122, item 160 may be a one of a variety of different objects, such as a display or product item in a store, and game console screen, a kiosk display, a keypad for a vending machine, and the like. Item 160 may have any suitable dimensions such that item 160 does not substantially interfere with the emission of ultrasonic waves 130 from transducer array 122.

In the shown example, each transducer 126 may have a 35-millimeter diameter and a 300-millimeter concaved radius, and may be positioned about 300 millimeters from a common focal point at focal volume 132. The concave surface for each transducer 126 is preferred to a planar surface transducer in this configuration when the diameter or characteristic length of each transducer 126 is long compared to the wavelength of ultrasonic waves 130 in air (e.g., greater than about one inch).

The annular hemispherical geometry for transducer array 122 is convenient for driving each transducer 126 with the same phase amplitude-modulating frequency signal, allowing all of transducers 126 to be operated in phase by a single amplifier (not shown). Transducer array 122 may be operated in the same manner as transducer array 22 (shown in FIG. 2) for emitting modulated ultrasonic waves 130 having a converging spherical wave pattern that converges at focal volume 132. At focal volume 132, the increased sound pressure levels increase the parametric conversion efficiency for demodulating ultrasonic waves 130, which produces audible sound waves 134. Audible sound waves 134 then emanate from focal volume 132 with a diverging spherical wave pattern to define a audible zone 144.

A person located within audible zone 144 will hear the audible content. To them, the audible sound waves 134 appear to emanate from item 160, thereby directing the listener's attention to item 160. This is useful in a variety of applications, such as for marketing and advertising applications.

Figure 5:
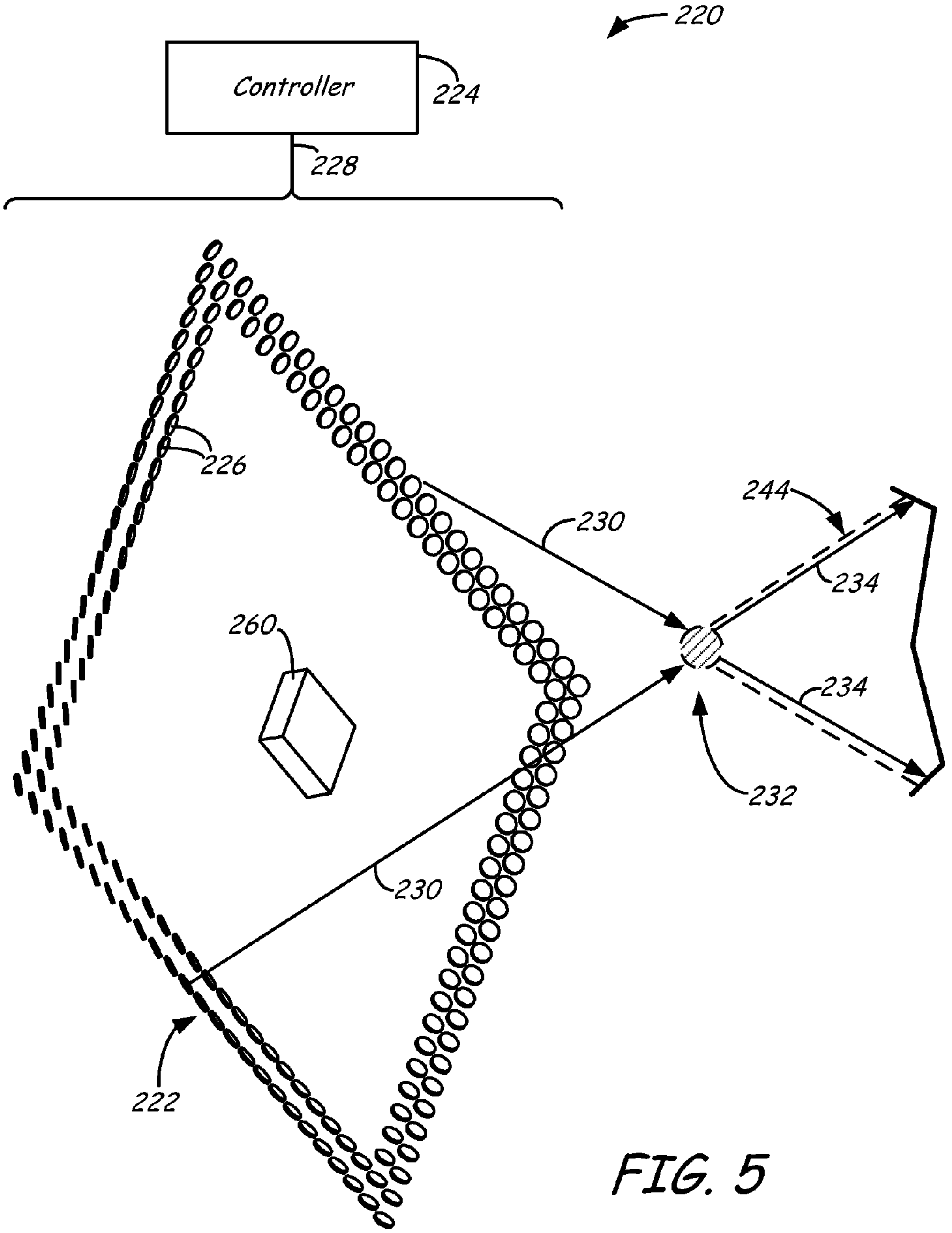
FIG. 5 is a perspective view of a second embodied parametric system of the present disclosure emitting converging ultrasonic waves, where the second embodied parametric system has transducers arranged in a rectangular pattern around an item.

FIG. 5 illustrates parametric system 220, which may function in a similar manner to parametric system 120 (shown in FIGS. 3 and 4), where the respective reference numbers are increased by "200" from those of parametric system 20 and by "100" from those of parametric system 120, and where sensors 58 are omitted for ease of discussion. In this embodiment, transducer array 222 has a rectangular ring geometry, where item 260 is located within the axial center of transducer array 222.

In comparison to the annular arrangement of transducers 126 (shown in FIGS. 3 and 4), which may be driven with the same phase amplitude-modulating frequency signal, the rectangular arrangement of transducers 226 typically require separate amplified phase-shifted signals to drive transducers 226 so that transducers 226 coherently add at focal volume 232. In other words, there are typically only groups of four transducers 226 driven by the same phase, requiring forty six separate amplified phase-shifted signals to drive a set of 184 transducers 226, as shown.

Figure 6:
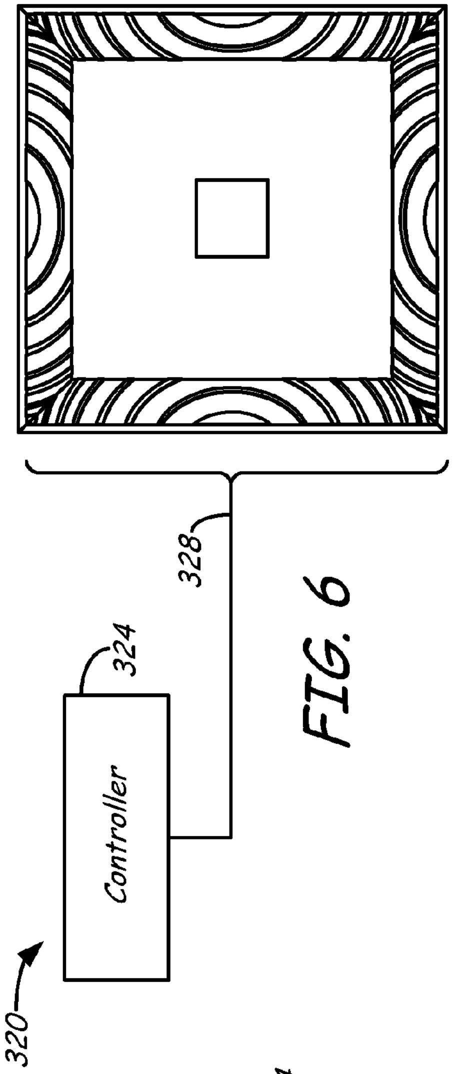
FIG. 6 is a front view of a third embodied parametric system of the present disclosure, having transducers arranged in a rectangular Fresnel-lens pattern around an item.
Figure 7:
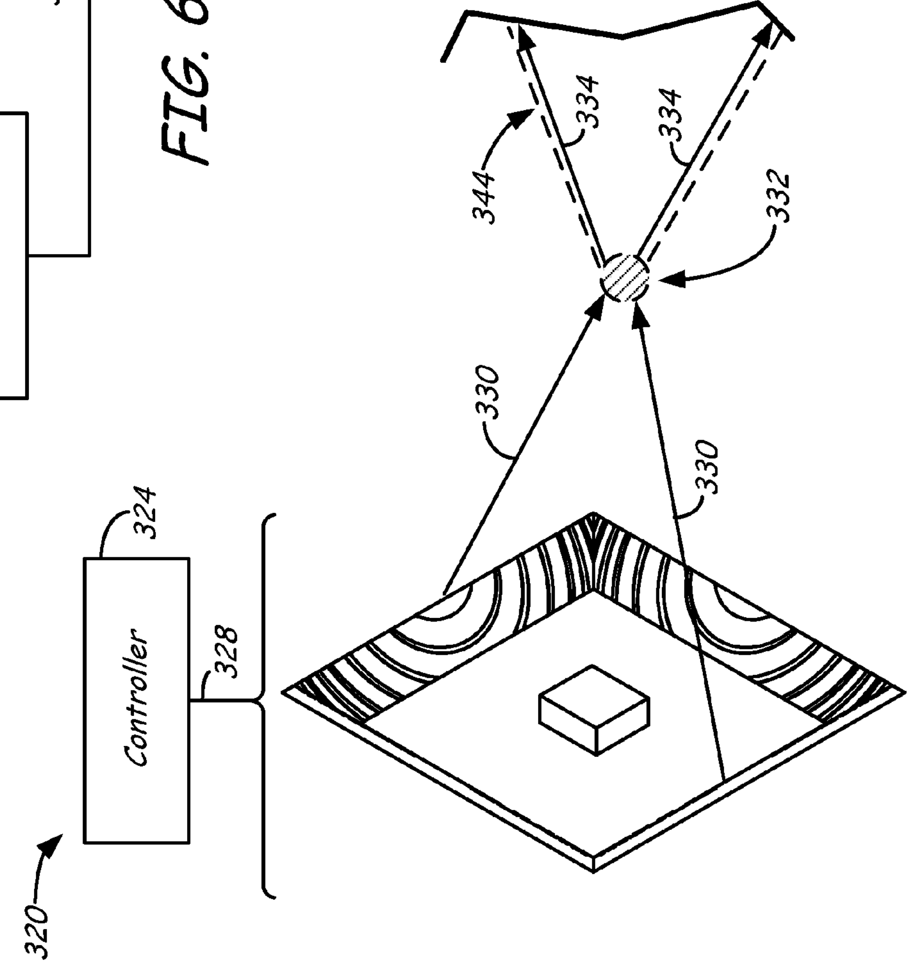
FIG. 7 is a perspective view of the third embodied parametric system of the present disclosure emitting converging ultrasonic waves.

FIGS. 6 and 7 illustrate parametric system 320, which may function in a similar manner to parametric system 220 (shown in FIG. 5), where the respective reference numbers are increased by "300" from those of parametric system 20, by "200" from those of parametric system 120, by "100" from those of parametric system 220, and where sensors 58 are omitted for ease of discussion. In this embodiment, transducer array 322 is formed from planar sheets of a transducer material with patterned electrodes.

As shown, the electrodes are patterned in a similar manner to a Fresnel lens such that the contiguous electrode is at a constant distance (within a quarter wave) from focal volume 332. In this way, a relatively large-area active transducer can be driven with relatively few phase-shifted amplifiers, achieving a high numerical aperture at focal volume 332. Furthermore, the lateral sizes of the electrodes of transducer array 322 are desirably small compared to a wavelength of ultrasonic waves 330 in air, so that the emission pattern locally resembles that of a line emitter.

Parametric systems 120, 220, and 320 illustrate examples of suitable transducer arrays that are free on paraxial transducers, allowing items to be framed by the transducer arrays. As discussed above, this produces an invisible source of audible sound in front of the framed item that directs a listener's attention towards that item. Additionally, by increasing the numerical aperture of the transducer array to generate ultrasonic waves with converging spherical wave patterns, and by eliminating paraxial transducers, the audible sound waves have an improved, more uniform dispersion pattern. Furthermore, the focused ultrasonic energy improves the parametric conversion efficiency, while a safety feedback mechanism (e.g., sensors 58) actively prevents the focal volume overlapping the listener. Thus, the parametric systems of the present disclosure produce audible sounds with good parametric conversion efficiencies, and that also direct a listener's attention to an intended item or point in space.

The terms "about" and "substantially" are used herein with respect to measurable values and ranges due to expected variations known to those skilled in the art (e.g., limitations and variabilities in measurements). Although the present disclosure has been described with reference to preferred embodiments, workers skilled in the art will recognize that changes may be made in form and detail without departing from the spirit and scope of the disclosure.

The invention claimed is:

1. A parametric system for generating audible sound, the parametric system comprising:

a transducer array free of paraxial transducers and configured to emit modulated ultrasonic waves in a converging wave pattern toward a focal volume, wherein the modulated ultrasonic waves are configured to demodulate to generate audible sound waves in the focal volume, and wherein the generated audible sound waves emanate from the focal volume with a diverging wave pattern;

a controller configured to operate the transducer array to emit the modulated ultrasonic waves; and wherein the transducer array comprises planar sheets of a transducer material with patterned electrodes such that the electrodes comprise a contiguous electrode at a constant distance from the center of the focal volume.

2. The parametric system of claim 1, wherein the transducer array comprises the plurality of transducers disposed laterally around an item.

3. The parametric system of claim 2, wherein the plurality of transducers are arranged in an annular hemispherical pattern.

4. The parametric system of claim 2, wherein the plurality of transducers are arranged in a rectangular pattern.

5. The parametric system of claim 1, and further comprising at least one sensor configured to communicate with the controller, and further configured to detect an obstruction within the focal volume, wherein the controller is further configured to attenuate the emission of the modulated ultrasonic waves when the at least one sensor detects an obstruction within the focal volume.

6. The parametric system of claim 5, wherein the at least one sensor comprises at least one camera-based sensor.

7. A parametric system for generating audible sound, the parametric system comprising:

a transducer array that is free of paraxial transducers, wherein the transducer array is configured to emit modulated ultrasonic waves with a numerical aperture ranging from greater than about 0.05 to about 0.5 toward a focal volume, such that the emitted modulated ultrasonic waves generate a sound pressure level in the focal volume of at least about 150 decibels; and a controller configured to operate the transducer array to emit the modulated ultrasonic waves, wherein the transducer array comprises a plurality of transducers that are spaced an integer number of wavelengths apart from the center of the focal volume.

8. The parametric system of claim 7, wherein the transducer array comprises the plurality of transducers disposed in an annular pattern or in a rectangular pattern.

9. The parametric system of claim 8, wherein each of the plurality of transducers has a concave surface.

10. The parametric system of claim 8, wherein the controller is configured to operate the transducer array using the same phase amplitude-modulating frequency signal for each of the plurality of transducers.

11. The parametric system of claim 7, and further comprising at least one sensor configured to communicate with the controller, and further configured to detect an obstruction within the focal volume, wherein the controller is further configured to attenuate the emission of the modulated ultrasonic waves when the at least one sensor detects an obstruction within the focal volume.

12. A method for generating audible sound, the method comprising:

emitting modulated ultrasonic waves in a converging wave pattern toward a focal volume with an array of transducers comprising a plurality of transducers spaced around the center of the focal volume and the array being free of paraxial transducers;

demodulating the emitted ultrasonic waves to generate audible sound waves in the focal volume; and emanating the generated audible sound waves from the focal volume in a diverging wave pattern.

13. The method of claim 12, wherein the converging wave pattern has a numerical aperture ranging from greater than about 0.05 to about 0.5.

14. The method of claim 12, wherein the converging wave pattern generates a sound pressure level within the focal volume of at least about 150 decibels.

15. The method of claim 12, wherein emitting the modulated ultrasonic waves in the converging wave pattern toward the focal volume comprises emitting the modulated ultrasonic waves from a transducer array that is free of paraxial transducers.

16. The method of claim 12, wherein emitting the modulated ultrasonic waves in the converging wave pattern toward the focal volume comprises emitting the modulated ultrasonic waves from a transducer array comprising planar sheets of a transducer material with patterned electrodes.

17. The method of claim 12, and further comprising detecting an obstruction within the focal volume.

18. The method of claim 17, and further comprising attenuating the emission of the modulated ultrasonic waves when detecting the obstruction within the focal volume.

* * * * *